United States Patent [19]

Hellinger et al.

[11] 4,388,743

[45] Jun. 21, 1983

[54] LID HANDLE COVER

[75] Inventors: David L. Hellinger; Gordon D. Bell, both of Fort Wayne; Gregory N. Brown, Lafayette; Robert J. Kennedy, Jr.; Kendall S. Smith, II, both of West Lafayette, all of Ind.

[73] Assignee: Lincoln Manufacturing Co., Inc., Fort Wayne, Ind.

[21] Appl. No.: 199,572

[22] Filed: Oct. 22, 1980

[51] Int. Cl.[3] .............................................. A47J 45/10

[52] U.S. Cl. ...................................... 16/116 A; 38/95

[58] Field of Search ............ 16/116 A, 114 R, 114 A, 16/116 R; 38/95; D7/132

[56] References Cited

U.S. PATENT DOCUMENTS

| | | | |
|---|---|---|---|
| 62,201 | 2/1867 | Hover | 38/95 |
| 208,035 | 9/1878 | Roberts | 38/95 |
| 463,335 | 11/1891 | Mulford . | |
| 701,305 | 6/1902 | Daughtry . | |
| 1,637,120 | 7/1927 | Larson | 38/95 |
| 1,731,982 | 10/1929 | Ortman | 16/116 A |
| 2,274,605 | 2/1942 | Hoffmeister | 16/110 |
| 2,425,245 | 8/1947 | Johnson | 121/36 |
| 2,543,832 | 3/1951 | Calvert | 16/116 |
| 3,912,140 | 10/1975 | Franges | 16/114 R X |
| 4,197,611 | 4/1980 | Bell et al. | D7/132 |

FOREIGN PATENT DOCUMENTS

| | | | |
|---|---|---|---|
| 413790 | 7/1934 | United Kingdom | 16/DIG. 12 |
| 433607 | 8/1935 | United Kingdom | 38/95 |

*Primary Examiner*—Andrew V. Kundrat
*Attorney, Agent, or Firm*—Albert L. Jeffers; John F. Hoffman

[57] ABSTRACT

A low thermal conductivity removable heat insulating cover for a cooking utensil lid handle has a hand grip portion for substantially surrounding the lid handle at least along a central portion thereof with a pair of closely adjacent portions depending downwardly from the hand grip portion toward the lid surface and with a protective portion adapted to lie closely adjacent the lid surface covering a region of that surface to form a barrier for preventing a user's hand from contacting the lid when grasping the hand grip portion is disclosed. In one form the protective portion comprises first and second lateral extensions of the ends of the closely adjacent portions remote from the hand grip portion with the cover being formed as a section of an extrusion of substantially uniform cross-sectional configuration. The closely adjacent portions may be releasably joined together by a rib and groove arrangement along the adjoining surfaces thereof. In another form, the hand grip portion is formed as a loop, and that loop extends to also surround the downwardly depending legs of the lid handle with the protective portion extending from the handle along the lid surface beyond the legs. In this form the closely adjacent portions slope inwardly toward one another to form a finger accepting depression near the central portion of the handle.

8 Claims, 10 Drawing Figures

LID HANDLE COVER

BACKGROUND OF THE INVENTION

The present invention relates generally to insulated hand grips for cooking utensil handles and more particularly to replaceable hand grips made of a resilient rubber-like material of low thermal conductivity which may be easily placed and removed about closed loop utensil handles. In particular the present invention relates to heat insulated covers especially suited to utensil lid handles of the type formed as relatively thin wide metal strap spot-welded near opposed ends of the strap to a utensil lid or cover.

The problem of inadvertently grasping the hot handle of hot pans and other cooking utensils has been with us for nearly as long as the art of cooking itself. In the domestic cooking environment where the use of cooking vessels is relatively infrequent and not for extended periods of time, the use of a common hot pad or oven mitt is a commonly employed solution, as is the forming of handles on the cooking vessels with a molded plastic or wooden grip portion which grip portion is either molded or riveted to the handle with the handle in turn being permanently welded or riveted to the vessel in question. Such fixed insulated grips are sometimes adequate for domestic cooking purposes but are frequently not adequate in the case of commercial cookware where frequent and prolonged use, as well as washing as high temperatures to sterilize the utensil, may cause the wooden or plastic handle to deteriorate rapidly and fail long before the remaining portion of the utensil is worn out. For this reason, commercial cookware is generally provided with a simple metal handle which is either riveted or welded to the main portion of the vessel.

For handles of the simple elongated variety, a satisfactory removable insulated handle is illustrated in U.S. Pat. No. 4,197,611 assigned to the assignee of the present invention. For closed loop handles provided in pairs on opposed side walls of larger cooking vessels, for example of the stockpot variety, a satisfactory removable insulated handle is illustrated in my copending application Ser. No. 199,575, filed Oct. 22, 1980. Several of the embodiments illustrated in this copending application are also suitable for lids of larger commercial cookware, but may however be more complex to manufacture, as well as being more complicated to install and remove than is optimumly desirable.

SUMMARY OF THE INVENTION

Among the several objects of the present invention may be noted the provision of an insulating lid handle cover to reduce the occurrence of burns during the removal and replacement of a lid on a cooking utensil; the provision of a readily removable, yet adequately protective, insulated cover for utensil lid handles; the provision of a "ziplock" arrangement for securing an insulating cover to a lid handle; the provision of insulating covers for cooking utensil lid handles which remain securely in position during use but which are easily removable for cleaning the utensil as well as for replacement with new insulated handle covers; the provision of a one piece removable heat insulating cover of low thermal conductivity which may be formed as an extrusion of substantially uniform cross-sectional configuration; the provision of a heat insulating cover especially suited for surrounding a relatively flat metal strap type closed loop handle; and the provision of a heat insulating cover for a closed loop handle which while providing no open finger path through the closed loop has the insulating material positioned relatively centrally in that closed loop so that finger accepting depressions are available to the user on both sides of the handle. These as well as other objects and advantageous features of the present invention will be in part apparent and in part pointed out hereinafter.

In general, a one piece removable heat insulating cover of low thermal conductivity has a hand grip portion for substantially surrounding a lid handle central portion with a pair of closely adjacent portions depending downwardly from the hand grip portion to lie between the legs of a utensil lid handle and to extend toward the lid surface as well as having a protective barrier portion which lies closely adjacent the lid surface covering a region of that surface to prevent a user's hand from contacting the lid when grasping the hand grip portion. The protective portion may comprise first and second lateral extensions of the ends of the closely adjacent portions remote from the hand grip portion, under which circumstances the cover may comprise a section of an extrusion of substantially uniform cross-sectional configuration from one section end to the other.

Also in general and in one form of the invention, the removable heat insulating cover may have the hand grip portion extending down the legs of a cooking utensil lid handle with the protective portion extending along the lid surface in all directions from the handle with the closely adjacent portions extending from the handle and sloping inwardly toward one another to be most closely adjacent about midway between the handle legs to form finger accepting depressions near the central portion of the handle.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
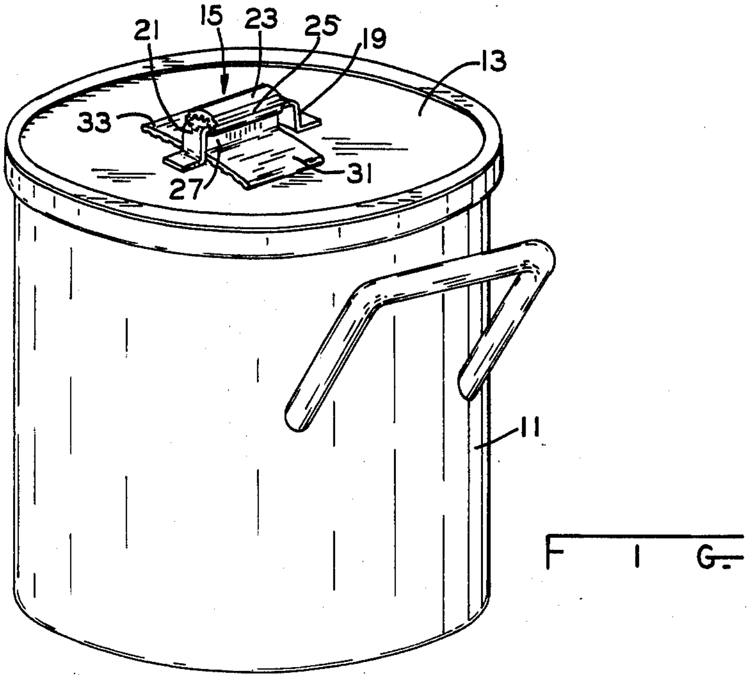
FIG. 1 is a perspective view of a stockpot type cooking utensil having a removable heat insulating cover about the handle of the lid.

In FIG. 1 a stockpot type cooking utensil 11 of the type having a pair of closed loop handles on opposed side wall portions of the utensil is illustrated along with a lid 13 of relatively conventional design having an upstanding generally centrally located lid handle 15 with a central portion 17 to be gripped by a user when removing or replacing the lid lying between downwardly depending legs 19 and 21 which attach the handle to the lid. The handle may be a metal strap spot welded near opposed ends thereof to the utensil lid or cover, if desired. A one piece removable heat insulating cover 23 of low thermal conductivity is illustrated in position with hand grip portion 25 substantially surrounding the lid handle central portion 17.

Figure 2:
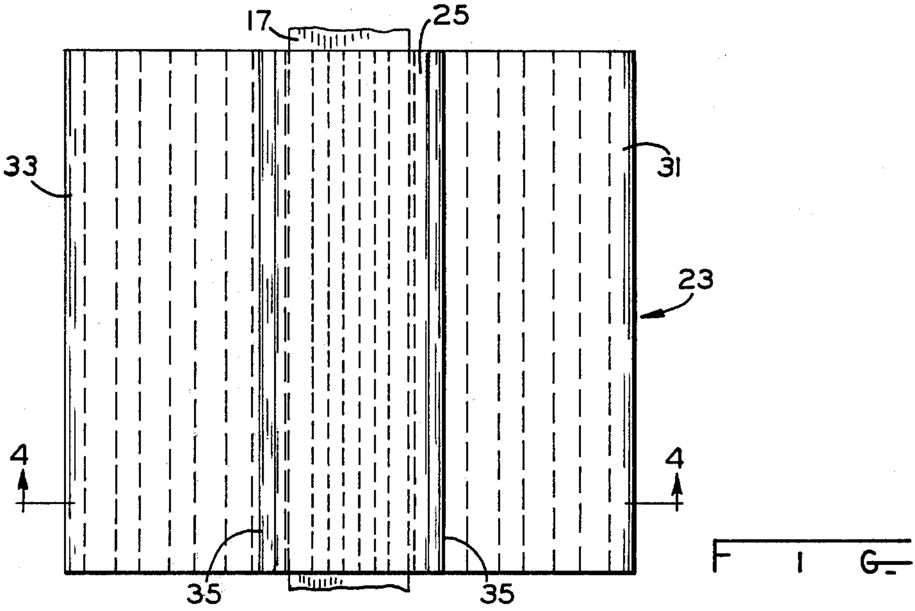
FIG. 2 is a view of the heat insulating cover of FIG. 1 from the top thereof.
Figure 4:
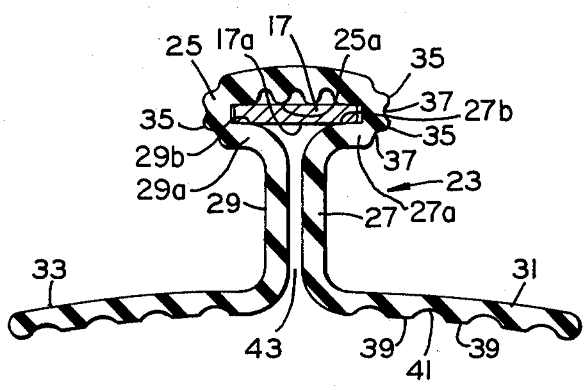
FIG. 4 is a view in cross-section along line 4—4 of FIG. 2.
Figure 3:
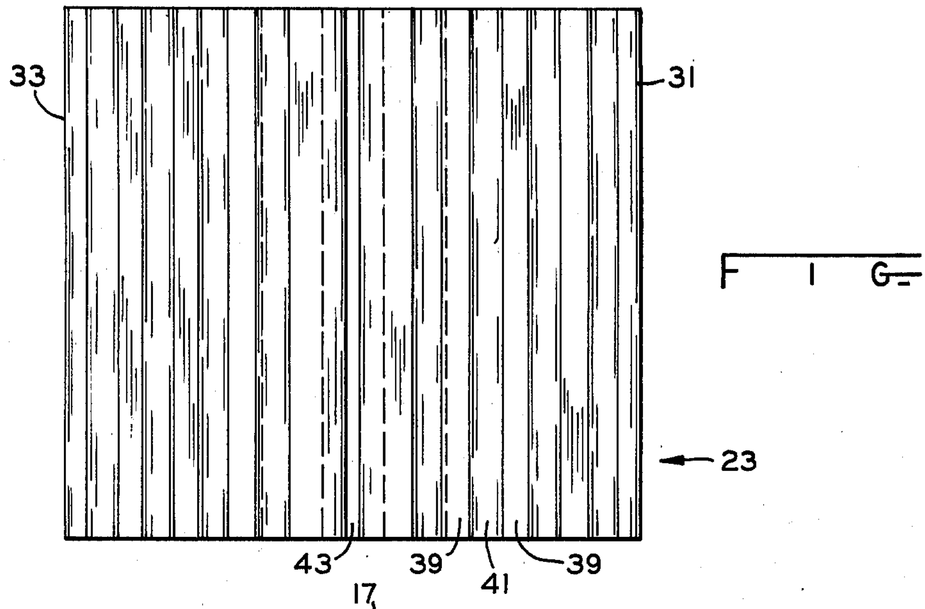
FIG. 3 is a view of the heat insulating cover of FIG. 1 from the bottom thereof.

Referring now primarily to FIG. 4, in conjunction with FIGS. 1, 2 and 3, the heat insulating cover 23 is seen to also include a pair of closely adjacent portions 27 and 29 which depend downwardly from the hand grip portion 25 to lie between the legs 19 and 21 of the handle and extend from the hand grip portion toward the surface of lid 13. The closely adjacent portions 27 and 29 are set inwardly of portion 25 to form a pair of shoulders **27*a* and 29*a* with internal surfaces 27*b* and 29*b* that engage an underneath surface 17*a* of handle 17 (FIG. 4). A protective portion comprising the lateral extensions 31 and 33 of the ends of the closely adjacent portions lies along the lid surface covering a region of that surface to prevent a user's hand from contacting lid 13 when gripping the hand grip portion 25. As viewed in FIG. 4, it is clear that the cover 23 may comprise a section of an extrusion of substantially uniform cross-sectional configuration from one section end to the other as will also be true of the embodiment illustrated in FIGS. 5 and 6 to be discussed subsequently. This extrusion may include a plurality of ridges 35 and grooves 37 forming a slip-reducing surface for a user to grip, and similarly may include corrugations along the protective portion surface which lies adjacent the lid surface of ridges 39 and intermediate troughs or grooves 41. This corrugated surface helps reduce heat conduction between the lid 13 and cover 23. Upper surface 25*a* is opposite and parallel to surfaces 27*b* and 29*b*. Lateral extensions or flaps 31 and 33 extend laterally outward beyond hand grip portion 25**.

As viewed in FIG. 4, the hand grip portion 25 may be thought of as a loop or bight between the closely adjacent portions 27 and 29 with open slot 43 allowing the closely adjacent portions or legs 27 and 29 to be spread apart opening the loop for ready removal and replacement of the cover on the handle. For most purposes, the natural resilience of the cover rubber-like material is sufficient to maintain the cover in the desired shape illustrated in FIG. 4, however, the adjacent surfaces of the closely adjacent portions 27 and 29 may be releasably joined together, if desired, in the manner illustrated in FIGS. 5 and 6.

Figure 5:
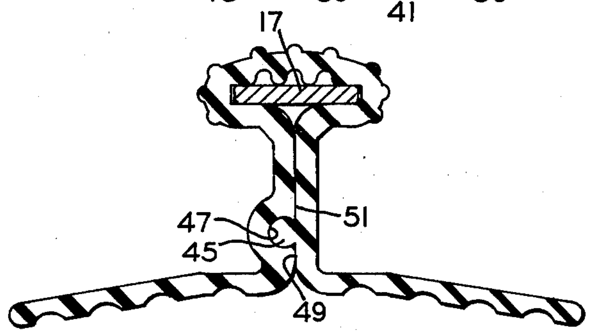
FIG. 5 is a view similar to FIG. 4 but illustrating in cross-section one modification of the heat insulating cover.
Figure 6:
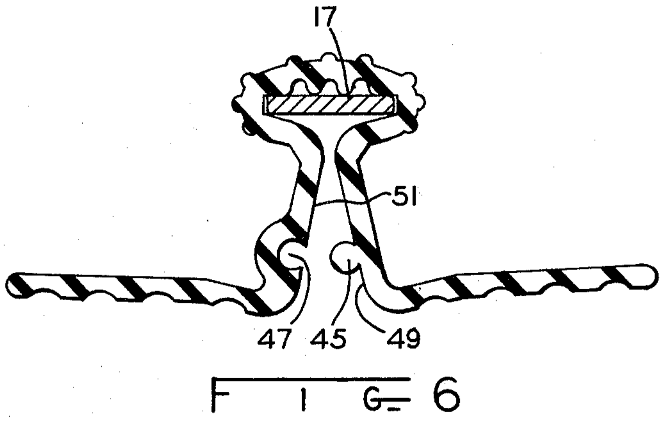
FIG. 6 is a view in cross-section similar to FIG. 5 but illustrating the rib and groove for releasably joining adjacent portions in its separated position preparatory for removal or immediately after placement of the cover about the handle.

In FIG. 6, the extruded cover is seen to include a rib 45 extending along adjacent portion surface 49, and a corresponding groove 47 extending along the adjacent portion surface 51, with rib 45 and groove 47 being deformably mateable to maintain the adjacent portions together when the cover is positioned on the lid handle, as illustrated in FIG. 5. This rib and groove function in a "ziplock" manner with the groove 47 expanding outwardly to accept the rib 45 when surfaces 49 and 51 are pressed together. The embodiment of FIGS. 5 and 6 is otherwise substantially identical to the embodiment illustrated in FIGS. 1 through 4.

Figure 7:
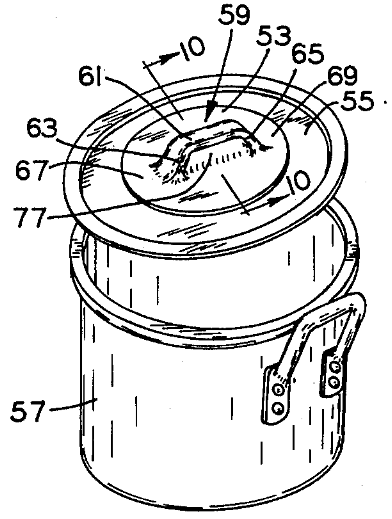
FIG. 7 is a perspective view of a stockpot type cooking utensil and lid having a further modification to the heat insulating cover on the lid handle.
Figure 8:
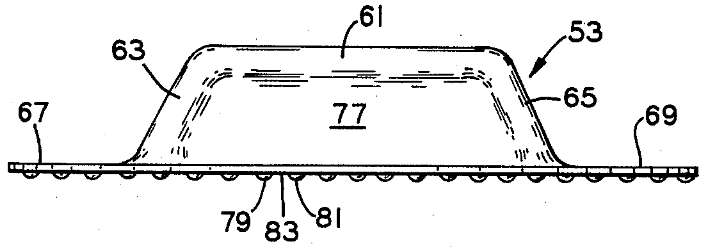
FIG. 8 is a side elevation view of the heat insulating cover of FIG. 7.
Figure 9:
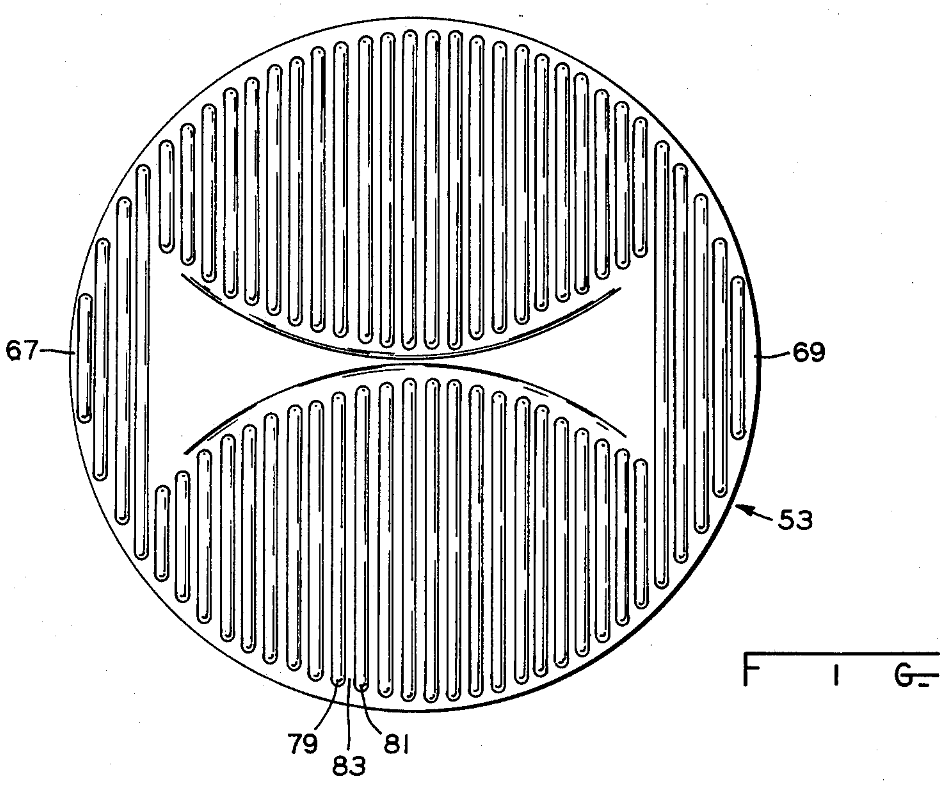
FIG. 9 is a view of the bottom of the heat insulating cover illustrated in FIG. 7.
Figure 10:
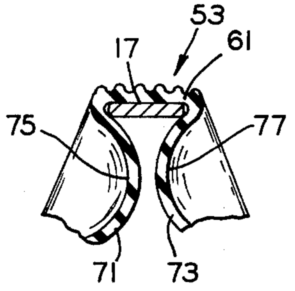
FIG. 10 is a view in cross-section along lines 10—10 of FIG. 7.

The heat insulating cover 53 of FIGS. 7 through 10 is illustrated in FIG. 7 on lid 55 of a stockpot type cooking utensil 57 of slightly different design than the corresponding utensil and lid of FIG. 1. Handle 59 has the legs thereof sloping outwardly somewhat more than the corresponding legs 21 and 19 of FIG. 1. This variation in the utensil lid handle is for illustration purposes only to illustrate design variations which may be freely interchanged among the various illustrated embodiments.

The bight or loop portion 61 of the embodiment of FIGS. 7 through 10 surrounds in addition to the hand grip of the lid handle the downwardly depending legs as at 63 and 65, and the protective portion extends from the handle along the lid surface beyond those legs as at 67 and 69. The closely adjacent portions 71 and 73 slope inwardly from the handle 59, converging toward one another to be most closely adjacent one another about midway between the handle legs as at 75 and 77, forming in this region finger accepting depressions near the central portion of the handle 59. As in the previous embodiments, the surface contacting the lid may be corrugated as by ridges 79 and 81 and intermediate grooves, such as 83, to reduce the heat conduction between the lid and cover. The cover is as before, of course, deformed to be placed over the handle on the lid.

The insulating covers disclosed herein may be formed of any resilient rubber-like material with a low thermal conductivity and preferably one of the several silicone materials disclosed in the aforementioned U.S. Pat. No. 4,197,611 which patent is incorporated herein by reference. The durometer, however, is slightly higher and the range of 50 to 70. Also, while the removable heat insulating cover of the present invention has been illustrated on the handle of the lid of a stockpot type cooking utensil, the cover will find utility in conjunction with a number of other cooking utensil handles.

From the foregoing it is now apparent that a novel insulating cover for a cooking utensil lid handle has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. In combination with a cooking utensil lid having on its surface an upstanding generally centrally located handle having a central portion to be gripped by a user when removing or replacing the lid and downwardly depending legs attaching the handle to the lid, a one piece removable heat insulating cover of low thermal conductivity having a hand grip portion for substantially surrounding the lid handle central portion, a pair of closely adjacent portions depending generally vertically downwardly from the hand grip portion to lie between the legs underneath the central portion of the handle and extending toward the lid surface, the hand grip portion comprising a bight between the closely adjacent portions, and a protective portion comprising a pair of protective flaps adapted to lie closely adjacent the lid surface covering the region of that surface to prevent a user's hand from contacting the lid when grasping the hand grip portion, said protective flaps extending laterally outward of said hand grip portion, said closely adjacent portions being set inwardly of said hand grip portion so as to form a shoulder between the closely adjacent portions and the hand grip portions, said shoulder having a pair of lower internal surfaces adapted to engage an underneath surface of the handle and an external surface adapted to be gripped by the user's fingers, said hand grip portion having an internal upper surface opposite said internal lower surfaces and generally parallel thereto defining a channel for enclosing the handle central portion, the cover resiliently encircling the lid handle central portion with the internal surfaces of said shoulder being in close proximity to the handle when released by the user.

2. The cover of claim 1 wherein the cover comprises a section of an extrusion of substantially uniform cross-sectional configuration from one section end to the other.

3. The cover of claim 1 wherein the hand grip portion is provided with a plurality of ridges and grooves forming a slip reducing surface for a user to grip.

4. The cover of claim 1 wherein the protective portion surface adjacent the lid surface is corrugated to reduce heat conduction between the lid and cover.

5. For the use with an upstanding generally centrally located cooking utensil lid handle having a central portion to be gripped by a user when removing or replacing the lid and downwardly depending legs attaching the handle to the lid, a one piece removable heat insulating cover of low thermal conductivity having a hand grip portion for substantially surrounding the lid handle central portion, a pair of closely adjacent portions depending downwardly from the hand grip portion to lie between the legs and extend toward the lid surface, and a protective portion adapted to lie closely adjacent the lid surface, covering a region of that surface to prevent a user's hand from contacting the lid when grasping the hand grip portion, the closely adjacent portions including, along their adjacent surfaces, means for releasably joining the adjacent portions together.

6. The cover of claim 5 wherein the means for releasably joining includes a rib extending along one surface and a corresponding groove extending along the other surface, the rib and groove being deformably mateable to maintain the adjacent portions together when the cover is positioned on the lid handle.

7. For use with an upstanding generally centrally located cooking utensil lid handle having a central portion to be gripped by a user when removing or replacing the lid and downwardly depending legs attaching the handle to the lid, a one piece removable heat insulating cover of low thermal conductivity having a hand grip portion for substantially surrounding the lid handle central portion, a pair of closely adjacent portions depending downwardly from the hand grip portion to lie between the legs and extend toward the lid surface, and a protective portion adapted to lie closely adjacent the lid surface, covering a region of that surface to prevent a user's hand from contacting the lid when grasping the hand grip portion, the hand grip portion comprising a bight between the closely adjacent portions wherein the bight also surrounds the downwardly depending legs with the protective portion extending from the handle along the lid surface beyond the legs.

8. The cover of claim 7 wherein the closely adjacent portions slope inwardly from the handle toward one another and are most closely adjacent one another about midway between the handle legs to form finger accepting depressions near the central portion of the handle.

* * * * *